Patented Apr. 25, 1933

1,905,758

UNITED STATES PATENT OFFICE

EMIL W. SCHWARTZ, OF BRIDGEPORT, CONNECTICUT, ASSIGNOR TO GENERAL ELECTRIC COMPANY, A CORPORATION OF NEW YORK

PROCESS FOR THE MANUFACTURE OF ELECTRICAL INSULATION

No Drawing. Application filed May 16, 1930. Serial No. 453,110.

This invention relates to a new and improved process for manufacturing rubber insulation and is more particularly concerned with the effective utilization of so-called "rubber reclaim" in the manufacture of rubber insulation for electrical conductors.

Prior to the present invention so-called "rubber reclaim" which is the product produced from waste rubber, such as rubber from old tires, boots, shoes and the like, has been used in the electrical industry in the manufacture of rubber insulation stock, particularly for insulation of electrical conductors. Such a process usually consisted in adding the rubber reclaim to previously masticated crude rubber along with fillers, accelerators, softeners and the like, and milling all the ingredients together and then passing the mass through the regular rubber mill, after which the stock was aged for a definite period prior to use in the tubing machine where the conductors are insulated.

Such a process had many objectionable features. The fillers used with the rubber reclaim and crude rubber represent usually more than half the total quantity of material used and since these fillers are of a bulky character and of a wide variation in consistency and plasticity, it has always been difficult to rapidly mix them with the rubber and other ingredients and obtain a homogeneous dispersion. The result has been that the final insulation has been defective to a large extent causing a great percentage of rejects unless the mixing was extremely thorough which necessitated a relatively long time, and the fillers were specially prepared prior to their introduction into the mass. This meant economic losses, for the mixing operation must, for commercial reasons, be carried out in a comparatively short time. Also delay in production was caused due to the labor necessary to locate and patch those parts of the insulation which failed to pass the electrical test. The improper dispersion also resulted in rough insulation and low dielectric strength due to agglomerates, and caused slower tubing machine operation in the final step of putting the insulation on the electrical conductors.

In accordance with my invention I have devised a process whereby I can produce a clean, smooth, rubber electrical insulation stock material in which the ingredients are homogeneously dispersed and which results in a superior electrical insulation stock material, faster mixing, smoother and faster tubing operation, lower handling charges and a cheaper material.

My invention consists in utilizing the devulcanizing process to incorporate the bulkiest materials so that instead of using the ordinary rubber reclaim, a so-called "blended reclaim" is used. Instead of incorporating the mineral filler and mineral rubber along with the other ingredients, I incorporate these ingredients immediately after the devulcanizing process and thereby subject them to all the refining operations through which waste rubber is put before the reclaim rubber is produced. As a result, all the bulkiest materials are incorporated in the reclaim rubber as a smooth and homogeneous dispersion therein.

In order to illustrate my invention, I will describe briefly the process I employ:

Waste rubber stock is ground up in the usual manner prior to being devulcanized. It is put through the devulcanizer in a manner well known in the art. After it comes out of the devulcanizer and is in the soft, plastic stage, mineral fillers are added, as for example, whiting, and mineral rubber, which is usually an air-blown asphalt and is used to impart moisture resisting properties to the rubber and to act as a reinforcing agent. Since the devulcanized rubber now goes through several refining operations before the rubber reclaim results, the mineral filler and mineral rubber are subjected to these refining operations. The addition of the mineral rubber and the mineral filler at this point is highly desirable and essential because such addition produces a reenforcing effect on the rubber blend. The mass undergoes a heavy grinding action between tightly closed rolls usually employed in the refining process at the time when such action is necessary and thus produces a fine dispersion of filler throughout the mass. The net result is that the rubber reclaim is now a blended reclaim and contains a homogeneous dispersion therein of the bulkiest ingredients utilized in the process.

This blended reclaim is now subjected to the steps well known in the art for making rubber insulation stock material. That is, the blended reclaim is mixed in a Banbury mixer with the usual compounding ingredients making up the batch, which usually are crude rubber, softener, such as paraffine, stearic acid, coal tar, pine tar and the like, and accelerator, which may be inorganic or organic or both, such as litharge and diorthotolylguanidine. After this mixing operation the batch is strained and is ready for use after aging for a few days. Sulfur is now added to the rubber stock which is then sent to the tubing machines where the electrical conductors are insulated. After being insulated by the tubing machine operation the insulated conductors are vulcanized in the usual manner.

By means of the present process the difficulty in mixing all of the initial ingredients in the Banbury mixer is overcome since the bulkiest materials have already been incorporated in the rubber reclaim. The blended rubber reclaim containing the mineral filler and the mineral rubber is of better quality and hence yields a better insulation stock material. The present process decreases the cost of rubber insulation because of elimination of handling charges on two of the bulkiest materials used in the manufacture of the insulation. Where heretofore it has been necessary to store and hence provide storage space for large quantities of mineral filler and mineral rubber which ingredients were initially mixed with the ordinary rubber reclaim and the other usual ingredients making up the batch, it is now possible by means of the present invention to eliminate the charges due to such storing and handling. In the electrical insulation field which is highly competitive, a material reduction in time of mixing the ingredients is accomplished by the present process. The present process dealing as it does with a blended reclaim containing a homogeneous dispersion of ingredients which themselves may vary considerably in consistency and plasticity, yields uniformly a much better grade of insulation material of a higher dielectric strength than that obtained by the prior method. The uniformity of dispersion of the materials through the mass facilitates the tubing machine operation which in turn speeds up the production and hence effects a further saving.

What I claim as new and desire to secure by Letters Patent of the United States is:

1. In the manufacture of rubber insulation including waste reclaim rubber for insulating electrical conductors, the process of forming insulation stock material which comprises devulcanizing waste rubber, adding thereto after the devulcanizing process and prior to the refining operations, fillers, and producing a blended reclaim, compounding said blended reclaim with crude rubber and other usual non-filler ingredients.

2. The process of providing electrical conductors with rubber insulation which comprises devulcanizing waste rubber, adding thereto after the devulcanizing process and at the point where the rubber comes out of the devulcanizer, whiting and air-blown asphalt, and producing a blended reclaim, compounding said blended reclaim with crude rubber to form insulation stock material, aging said stock material, compounding sulfur therewith, applying the product to electrical conductors, and vulcanizing the insulated conductors.

3. The process of insulating electrical conductors with rubber insulation which comprises devulcanizing waste rubber, adding thereto after the devulcanizing process and prior to the refining operations, fillers, and producing a blended reclaim, compounding said blended reclaim with crude rubber, softening agent, and accelerator to form insulation stock material, adding sulfur to said insulation stock material, forming therefrom an insulating sheath on electrical conductors, and vulcanizing said conductors so insulated.

4. The process of utilizing vulcanized waste rubber in the manufacture of electrical insulation which consists in producing a soft plastic product from said waste rubber by devulcanization, adding mineral fillers to said product while in a soft condition, refining said mixture and subsequently blending the refined product with crude rubber and non-filler compounding agents.

In witness whereof, I have hereunto set my hand this fourteenth day of May, 1930.

EMIL W. SCHWARTZ.